United States Patent Office 2,986,568
Patented May 30, 1961

2,986,568
MANUFACTURE OF BUTYROLACTONES
James D. Johnston, Baton Rouge, La., assignor to Ethyl Corporation, New York, N.Y., a corporation of Delaware
No Drawing. Filed Apr. 26, 1956, Ser. No. 580,730
3 Claims. (Cl. 260—343.6)

This invention relates to the manufacture of functionally substituted heterocyclic compounds and their utilization in chemical processes. In particular, this invention relates to the manufacture and utilization of butyrolactones.

The lactones derivable from butyric acid have long been desirable articles of commerce as they provide a convenient and practical route to the manufacture of organic materials having a diversity of uses. In particular, such lactones provide easily accessible compounds useful in the synthesis of resins, feed supplements, special solvents, and in general materials having a variety of functional substituents. In particular, materials which can be effectively produced from butyrolactones include methionine, glutaro-half-nitrile, pyrrolidones, substituted pyrrolidones, such as vinyl pyrrolidones and polyvinyl pyrrolidones, and polyfunctional compounds such as glutaronitrile and pentamethylene diamine. Heretofore, butyrolactones have been produced only by devious routes or have been produced as by-products in relatively uncontrollable amount from other reactions.

It has long been known in the art that certain halo carboxylic acids can be inter-reacted with polymerizable olefins to produce long chain polymeric materials having functional substituents, under certain specified conditions of temperature and pressure and in the presence of certain catalysts. While this appears to be a general reaction for the higher members of the halo-carboxylic acid series, this reaction does not produce lactones and therefore has no utility in this chemical manufacturing art.

It is therefore an object of this invention to provide a direct route to lactones containing four carbon atoms in the heterocyclic ring. It is a further object of this invention to provide such materials in such a condition that they can be employed in further synthetic steps to provide a variety of end products. A still further object of this invention is to provide such lactones in a condition and form useful in themselves. A specific object of this invention is to produce, by direct and economical means, gamma butyrolactone. These and other objects of this invention will be more apparent from the description hereafter.

The above and other objects are accomplished by reacting bromoacetic acid and derivatives of the carboxylic group thereof with alpha olefins at a temperature between about 150° C. and 300° C., at pressures in the range of between about 1 and about 50 atmospheres and with a catalyst. Catalysts which produce free radicals under the reaction conditions and polymerization catalysts are preferred. In general, the alpha olefins which can be employed in this reaction comprise polymerizable olefins wherein the alpha carbon atom contains only hydrogen or fluorine. While in some instances it is preferred that the beta carbon atoms be substituted only with hydrogen, halogen or hydrocarbon radicals, certain alpha olefins containing substituted hydrocarbon radicals can be employed, wherein such substituents are organic or inorganic radicals inert under the conditions of this reaction. In general, it is preferred to employ bromoacetic acid or lower alkyl esters thereof, or the anhydride thereof.

Therefore, from the foregoing it can be seen that this invention provides a novel process for the manufacture of materials having the general structure

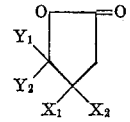

wherein $X_1$ and $X_2$ are the same or different and are hydrogen and fluorine, and $Y_1$ and $Y_2$ are the same or different and are hydrogen, halogen, hydrocarbon groups or substituted hydrocarbon groups. In particular, it is preferred that in the substituted hydrocarbon embodiment of this invention, the substituents are inert under the reaction conditions and do not inhibit free radical initiated reactions. The organic radicals $Y_1$ or $Y_2$ can be aliphatic or aromatic. Among the aliphatic radicals, it is preferred to employ the lower alkyl radicals having 1 to about 8 carbon atoms and of the aromatic radicals, it is preferred to employ radicals having from 6 to about 10 carbon atoms and of these, it is preferred to employ the monocarbocyclic and dicarbocyclic aromatic radicals.

It is surprising that when all the conditions and requirements of this invention are met, a high yield of butyrolactone is obtained and the product is relatively uncontaminated with undesirable by-products and, in particular, products of polymerization. In this art, it has not heretofore been known that such results could be achieved. Indeed, when supposedly similar reactants have been employed under conditions resembling in some respects the conditions of this invention, an entirely different result has been obtained. Only by employing the particular reactants herein disclosed and within the relatively narrow conditions of reaction stated above is useful result of this invention obtained.

The process of this invention can be conducted in the presence or absence of a solvent and in the embodiment wherein a solvent is employed, the principal requirement is that the solvent system be relatively inert to the reactants and catalysts under the reaction condition. Alternatively, the bromoacetic reactant can be employed as a solvent.

Materials produced by this invention are sometimes referred to as gamma butyrolactones. However, for convenience hereinafter they may be referred to simply as butyrolactones, it being understood that the five membered gamma butyrolactone being implicit therein.

To more fully understand the process of this invention, the following typical example is described employing as reactants ethylene and methyl bromoacetate. However, as will be discussed further, the process can be conducted in the same general fashion with reactants as indicated above and the following description is presented for illustrative purposes only.

In a reaction vessel provided with means for introducing liquid and gaseous reactants and maintaining an elevated temperature and provided with means for agitation and means for controlling the temperature of the contents, is introduced 250 parts of methyl bromoacetate, 250 parts of hexane and 3 parts of cumene hydro peroxide. This mixture is heated to a temperature of about 160° C. and ethylene is introduced into the vessel until a pressure of 30 atmospheres is obtained. As the reaction continues, the ethylene pressure is maintained by further additions at between 25 and 30 atmospheres for a period of 2 hours. At the completion of this time, the reaction vessel is cooled at 25° C., the pressure is reduced to atmospheric venting ethylene and methyl bromide. To recover the product the contents are subjected to distillation at atmospheric pressure and a first cut of unreacted bromoacetic acid and solvent is taken. The residue of the reaction vessel consists of 90 parts of butyrolactone representing a nearly quantitative yield based upon recovered methyl bromoacetate. The material it suitable for many uses in this form but can be further purified by distillation to remove a small amount of high boiling residue. The methyl bromide recovered with the unreacted ethylene is subjected to acid hydrolysis to form hydrogen bromide. This in turn when reacted with glycolic acid either in the presence of methyl alcohol or in the subsequent presence of methyl alcohol produces in high yield, and in a condition suitable for recycle to this process, methyl bromoacetate.

In general, as in the foregoing example, peroxide catalysts are suitable. Thus, among peroxygen compounds can be employed the aliphatic peroxides, such as acetyl peroxide, propionyl peroxide and the higher peroxides such as lauroyl peroxide, as well as the hydroperoxides thereof; aromatic peroxides, such as benzoyl peroxide and benzoyl hydroperoxide. Furthermore, inorganic peroxygen compounds can be employed such as hydrogen peroxide. Other per compounds can be employed as catalysts including the perborates, the percarbonates, and the persulfates. In addition, other free radical initiators such as tetraethyllead, hydrazines, substituted hydrazines and their salts, and amine oxides, such as triethyl amine oxide, are useful. Other means for producing free radicals which can be employed include ultraviolet light with or without certain chemical photosensitizers. In general, the catalysts useful in this invention are employed in amount corresponding to about 0.001 and 5.0 weight percent of the alpha olefin. Particularly preferred quantities comprise 0.025 and 0.10 weight percent based on the alpha olefin.

The reaction conditions employed in practicing this invention are critical and high yields of the butyrolactones are obtained by careful selection of the temperature and pressure between the limits of 100° C. and 300° C., and up to about 50 atmospheres. If higher pressures are employed an uncontrollable and undesirable polymerization reaction occurs and likewise at lower temperatures the lactonization reaction is suppressed. It is further desirable to employ proportions of the reactants so that the olefin is not present in substantial excess of the stoichiometric equivalent based on the bromoacetic reactant.

In one embodiment of the invention in which particularly good results are obtained, the bromoacetic reactant and the alpha olefin are introduced into the reaction vessel with or without a solvent and while maintaining the contents of the vessel at the desired reaction temperature and pressure, the catalyst is continuously introduced in an inert carrier liquid.

The process of this invention is further illustrated with reference to the following typical examples.

In the examples which follow, unless otherwise specified, all parts are by weight.

*Example I*

To a reaction vessel as described above is added 250 parts of bromoacetic acid dissolved in 250 parts of a light petroleum fraction containing 4 parts of cumene hydroperoxide. After reaching a temperature of 170° C., 100 parts of vinylidene chloride is introduced under the pressure existing in the reaction vessel. After operating as in the foregoing general example, a nearly quantitative yield of dichlorobutyrolactone is produced based upon the bromoacetic acid consumed.

In addition to the foregoing, equivalent results are obtained employing as a catalyst diacetyl peroxide, hydrazine or tetraethyllead.

*Example II*

A process according to Example I is conducted employing propylene and the solvent is light naphtha. The catalyst employed is lauroyl peroxide. In this example, employing a maximum temperature of 150° C. and a maximum pressure of 20 atmospheres, near quantitative conversion of bromoacetic acid to gamma methylbutyrolactone is obtained.

*Example III*

In accordance with Example I, bromoacetic anhydride is reacted with vinyl chloride in the presence of a hydrazine catalyst using diamyl ether as a solvent. By this procedure, the product is chlorobutyrolactone.

*Example IV*

A solution containing 250 parts of methyl bromoacetate in 200 parts of a kerosene fraction, 2 parts of benzoyl peroxide and 150 parts of styrene is heated over a period of 4 hours at a temperature of 120° C. At the end of this time, the temperature of the contents of the vessel are reduced to 25° C. and subjected to a vacuum distillation to separate the unreacted styrene and methyl bromoacetate from the gamma phenyl butyrolactone.

*Example V*

Example I is repeated employing vinyl fluoride under substantially identical conditions, with the exception that about 2 parts of tetraethyllead in the dimethyl ether of ethylene glycol is employed as a catalyst and solvent respectively. The product, fluorobutyrolactone, was recovered in a yield better than 90 percent based upon the bromoacetic acid consumed.

As in the foregoing, when alpha fluoro styrene is employed, a high yield of gamma fluoro gamma phenyl butyrolactone is obtained.

*Example VI*

A solution containing 200 parts of allyl chloride in 300 parts of t-butyl alcohol is reacted with 350 parts bromoacetic anhydride and 4 parts di-tert-butyl peroxide at a temperature of 130° C. In accordance with the foregoing procedure, by distillation of the reaction mixture, a high yield of gamma (chloromethyl)butyrolactone is obtained.

*Example VII* p-Nitro-alphamethylstyrene is reacted with bromoacetic acid in mineral oil with acetyl peroxide as the catalyst. Upon completion of the reaction and stratification of the reaction mixture, the gamma-(4-nitrophenyl)-gamma-methylbutyrolactone in mineral oil was separated from the unreacted bromoacetic acid. This solution can be employed directly in further chemical manufacturing operations.

In general, examples of the alpha olefins which can be employed in accordance with the foregoing examples, include ethylene, propylene, isobutylene, n-pentene-1, octene-1 and other isomers thereof, vinyl chloride, vinylidene chloride, allyl chloride, 1-fluoropropylene, 1,1-difluoropropylene, 1-fluoro-n-pentene-1, alphafluorostyrene, alpha,beta difluorostyrene, 2,6-dichlorostyrene and the like.

Among the esters of bromoacetic acids which can be employed are included the lower alkyl esters, such as methyl, ethyl, propyl, butyl, pentyl, octyl and isomers thereof. In particular, those containing up to about 8 carbon atoms in the ester group are preferred. Furthermore, the aryl esters, such as phenyl bromoacetate, alpha and beta naphthyl bromoacetate and the like can be employed.

As solvents in the process of this invention, it is preferred to employ aliphatic solvents, in particular the aliphatic hydrocarbon solvents which are liquid at the reaction conditions. Among materials suitable therefore are the hexanes, heptanes, naphthas, diesel oils, mineral oils and other petroleum oil fractions having substantially no unsaturation. Furthermore, certain substituted aliphatic solvents wherein the substituents are inert under reaction conditions can be employed. Typical of such solvents are the ethers and tertiary alcohols.

The process of this invention can be conducted as a batch, a semi-continuous, or a continuous process. Furthermore, this process can be advantageously correlated with a process for preparation of the bromoacetic substrate by recycling the bromide by-product to a reactor containing a glycolic substrate. In such embodiments wherein the bromide by-product is hydrogen bromide, a simple one step recycling operation is achieved. When carboxylic derivatives of the bromoacetic reactants of this invention are employed the bromide product is produced in the form of an organic or inorganic bromide and an intermediate hydrolysis step is preferred to convert said by-product to hydrogen bromide prior to reacting with the glycolic reactant.

The proportions of bromoacetic substituent and alpha olefin are important to obtain maximum efficiency in the production of desired butyrolactone. Particularly, it is preferred to employ the alpha olefin at or below the theoretical stoichiometric equivalent required to prevent undue polymerization and subsequent incomplete reaction. Therefore, it is preferred in a batch operation to employ the alpha-olefin in proportions between 0.1 and 1.0 moles per mole of bromoacetic acid or carboxylic derivatives thereof. In a continuous operation the undesirable side reaction can be controlled by introducing the alpha olefin into a moving stream of the bromoacetic acid or carboxylic derivative whereby the local concentration of the alpha olefin at the point of introduction is less than equivalent to said acetic compound.

I claim:
1. A process for the manufacture of butyrolactones which comprises reacting, in one step, a compound from the group consisting of bromoacetic acid, lower alkyl esters thereof, and bromoacetic anhydride with up to and including essentially the theoretical stoichiometric equivalent of an alpha olefin selected from the group consisting of ethylene, propylene, isobutylene, n-pentene-1, octene-1, vinyl chloride, vinylidene chloride, allyl chloride, 1-fluoropropylene, 1,1-difluoropropylene, 1-fluoro-n-pentene - 1, alpha-fluorostyrene, alpha,beta-difluorostyrene, 2,6-dichlorostyrene, styrene, and vinyl fluoride at a pressure below about 50 atmospheres, at a temperature above about 150° C., in the presence of a free radical initiating catalyst, and in a system which is essentially inert to the reactants and catalyst under the reaction conditions.

2. A process for the manufacture of butyrolactones which comprises reacting, in one step, ethylene with at least a molecular equivalent of methyl bromoacetate at a temperature between about 150° C. and 300° C. and at a pressure between about 1 and 50 atmospheres, in the presence of a free radical initiating polymerization catalyst, and in a system which is essentially inert to the reactants and catalyst under the reaction conditions.

3. The process of claim 2 wherein said free radical initiating polymerization catalyst is cumene hydroperoxide.

References Cited in the file of this patent

UNITED STATES PATENTS

| | | |
|---|---|---|
| 2,485,100 | Ladd et al. | Oct. 18, 1949 |
| 2,569,064 | Ladd et al. | Sept. 25, 1951 |